United States Patent [19]
Byrne et al.

[11] 3,927,979
[45] Dec. 23, 1975

[54] TECHNIQUE FOR MEASURING THE CARBON MONOXIDE AND REACTIVE HYDROCARBON CONTENT OF A GAS

[75] Inventors: Francis P. Byrne, Murrysville; Thomas D. Kaczmarek, Pittsburgh, both of Pa.

[73] Assignee: Westinghouse Electric Corporation, Pittsburgh, Pa.

[22] Filed: June 10, 1974

[21] Appl. No.: 478,139

[52] U.S. Cl......... 23/232 R; 23/230 PC; 23/253 PC; 23/254 R
[51] Int. Cl.² ......................................... G01N 31/12
[58] Field of Search...... 23/230 PC, 253 PC, 232 R, 23/232 E, 254 R, 254 E

[56] References Cited
UNITED STATES PATENTS

| | | | |
|---|---|---|---|
| 3,549,327 | 12/1970 | Fergusson | 23/232 E |
| 3,558,283 | 1/1971 | Freeman et al. | 23/232 E |
| 3,674,436 | 4/1972 | Geul | 23/232 E |
| 3,679,364 | 7/1972 | Teal et al. | 23/230 PC |
| 3,692,492 | 9/1972 | Poli, Jr. et al. | 23/254 E |
| 3,791,936 | 2/1974 | Pebler et al. | 23/232 R X |
| 3,819,499 | 6/1974 | Hoogeveen et al. | 23/253 PC X |
| 3,837,808 | 9/1974 | Sugimoto et al. | 23/232 E |

*Primary Examiner*—Morris O. Wolk
*Assistant Examiner*—Timothy W. Hagan
*Attorney, Agent, or Firm*—M. P. Lynch

[57] ABSTRACT

A combustion technique is employed to combustively react oxygen with carbon monoxide present within a gas mixture and to combustively react oxygen with the total combustibles content of the gas such that the carbon monoxide content and reactive hydrocarbon content of the gas is determined on the basis of the oxygen required to produce stoichiometric reactions with the carbon monoxide and the total combustible content of the gas. The technique employs the use of a hydrocarbon trap which traps reactive hydrocarbons, i.e., those typically resulting in the development of pollutants and smog, while passing hydrocarbons such as methane which generally do not react to produce undesirable pollutants and smog.

4 Claims, 2 Drawing Figures

TECHNIQUE FOR MEASURING THE CARBON MONOXIDE AND REACTIVE HYDROCARBON CONTENT OF A GAS

BACKGROUND OF THE INVENTION

Numerous techniques have been developed for use in monitoring stack gases as well as automobile exhaust gas to minimize the pollutants and smog producing elements as well as providing control of the fuel air ratio to achieve optimum efficiency. In a combustion process there exist numerous variables affecting the composition and content of exhaust gases. Carbon monoxide and hydrocarbons represent a major constituent contributing to smog and air pollution.

In the automobile internal combustion engine for example, exhaust gas composition is a function of the nature of the fuel, engine design and operation of the vehicle. If the fuel is completely burned the combustion products are carbon dioxide and water. In actual practice, however, combustion is not complete and a complex mixture of products is formed. In addition to the carbon dioxide and water, a typical exhaust composition will include carbon monoxide, unburned hydrocarbons, aldehydes and other partially oxygenated hydrocarbons, organic sulfur compounds, hydrogen, oxides of nitrogen, and various particulates such as lead and inorganic compounds as well as oxygen. The products of major interest as pollutants are carbon monoxide, reactive hydrocarbons, and oxides of nitrogen.

The carbon monoxide content of automobile exhaust may range between 0.5% and 10% with most exhaust gases below 5%. The hydrocarbon content, herein collectively expressed as being equivalent to hexane, may be as high as 0.5%. The hydrocarbon content may be reduced to levels as low as 0.5% in well tuned engines.

The hydrocarbon constituents of exhaust gas are many and varied. This situation is further complicated due to the fact that not all of the hydrocarbons are of equal importance from a pollution standpoint. Experiments conducted in smog chambers, have indicated that individual hydrocarbons can have widely varying photochemical reaction rates of the type generally associated with fog formation. The hydrocarbons of interest are those which can be classified as reactive hydrocarbons or hydrocarbons which are quick to react to produce smog and pollution. Constituents such as methane/acetylene which are among the largest constituents of the hydrocarbon fraction do not react readily to produce pollution and are therefore not considered to be reactive hydrocarbons for the purposes of the discussion to follow which will be directed to smog and air pollutant reactive hydrocarbons. Hereinafter, the term reactive hydrocarbons as it relates to the disclosed invention shall specifically mean smog and air pollutant reactive hydrocarbons.

Traditional techniques for determining the hydrocarbon and carbon monoxide content of gases include the non-dispersive infrared technique as well as the use of the flame ionization detector.

There is disclosed hereafter a new approach to determine the hydrocarbon and carbon monoxide content of a gas and this approach is based on a combustion technique which effectively ignores combustibles such as methane which are not deemed to be a serious contributor to pollutants and smog.

SUMMARY OF THE INVENTION

Recognizing that oxygen is present in practically all exhaust gases and if not present can be readily introduced, there is disclosed herein with reference to the accompanying drawings a combustion technique for measuring the carbon monoxide and reactive hydrocarbon content of gases. Measurement of the oxygen required to stoichiometrically react with the carbon monoxide in the gas as well as the oxygen required to stoichiometrically react with the total combustibles within a gas provides the information necessary to determine the carbon monoxide and reactive hydrocarbon content in the gas.

This technique can be used to determine the reactive hydrocarbon content and carbon monoxide content of gases under any of the following conditions:

1. The oxygen content of gas is essentially
2. Oxygen is present in the gas but the combustibles present are in excess* of the oxygen.
3. Oxygen is present in the gas and the oxygen is in excess* of the combustibles present in the gas.

*Excess means a condition whereby oxygen or combustibles are present in an amount excess of that required for stoichiometric combustion.

Under conditions (1) and (2) supplemental oxygen is introduced in the gas stream to determine the amount of total oxygen required to stoichiometrically react with the total combustibles content of the gas. Also following trapping or filtering of the reactive hydrocarbons present in the gas, the oxygen required to stoichiometrically react with the remaining combustibles which include reactive hydrocarbons, carbon monoxide and other hydrocarbons including methane is measured. The carbon monoxide content is determined from this measurement as representing the amount of oxygen required to change carbon monoxide to carbon dioxide. The reactive hydrocarbon content is determined by subtracting the amount of oxygen required to achieve the stoichiometric reaction with the carbon monoxide from the amount of oxygen required to achieve a stoichiometric reaction with the total combustible content of the gas. The difference between these two oxygen measurements represents the oxygen required to combust reactive hydrocarbons to produce carbon dioxide and water and is indicative of the reactive hydrocarbon content of the gas.

Under the excess oxygen condition identified as (3) above there is no need to introduce supplemental oxygen. The total oxygen content of the gas is measured before and after stoichiometric reaction between oxygen and carbon monoxide following trapping of the reactive hydrocarbons. The difference in oxygen before and after combustion with the carbon monoxide is indicative of the carbon monoxide content of the gas as representing the oxygen required to convert carbon monoxide to carbon dioxide. The measurement of the hydrocarbon content is achieved by measuring total oxygen before and after stoichiometric reaction of oxygen and the total combustibles content of the gas. Subtraction of the oxygen required for stoichiometric combustion of the carbon dioxide from the oxygen required for stoichiometric combustion of the carbon dioxide for the oxygen required for stoichiometric combustion of the total combustibles produces a measurement indicative of the reactive hydrocarbon content.

There is further disclosed a novel hydrocarbon trap for use in the combustion technique described above which utilizes the composition of silver ions added to a chromium trioxide/sulfuric acid/silica gel combination. This hydrocarbon trap provides improved efficiency over the conventional filters or traps by adding acetylene and ethylene to the trapped hydrocarbons while passing methane.

BRIEF DESCRIPTION OF THE DRAWINGS

The invention will become more readily apparent from the following exemplary description in connection with the accompanying drawings.

DESCRIPTION OF THE PREFERRED EMBODIMENT

Figure 1:
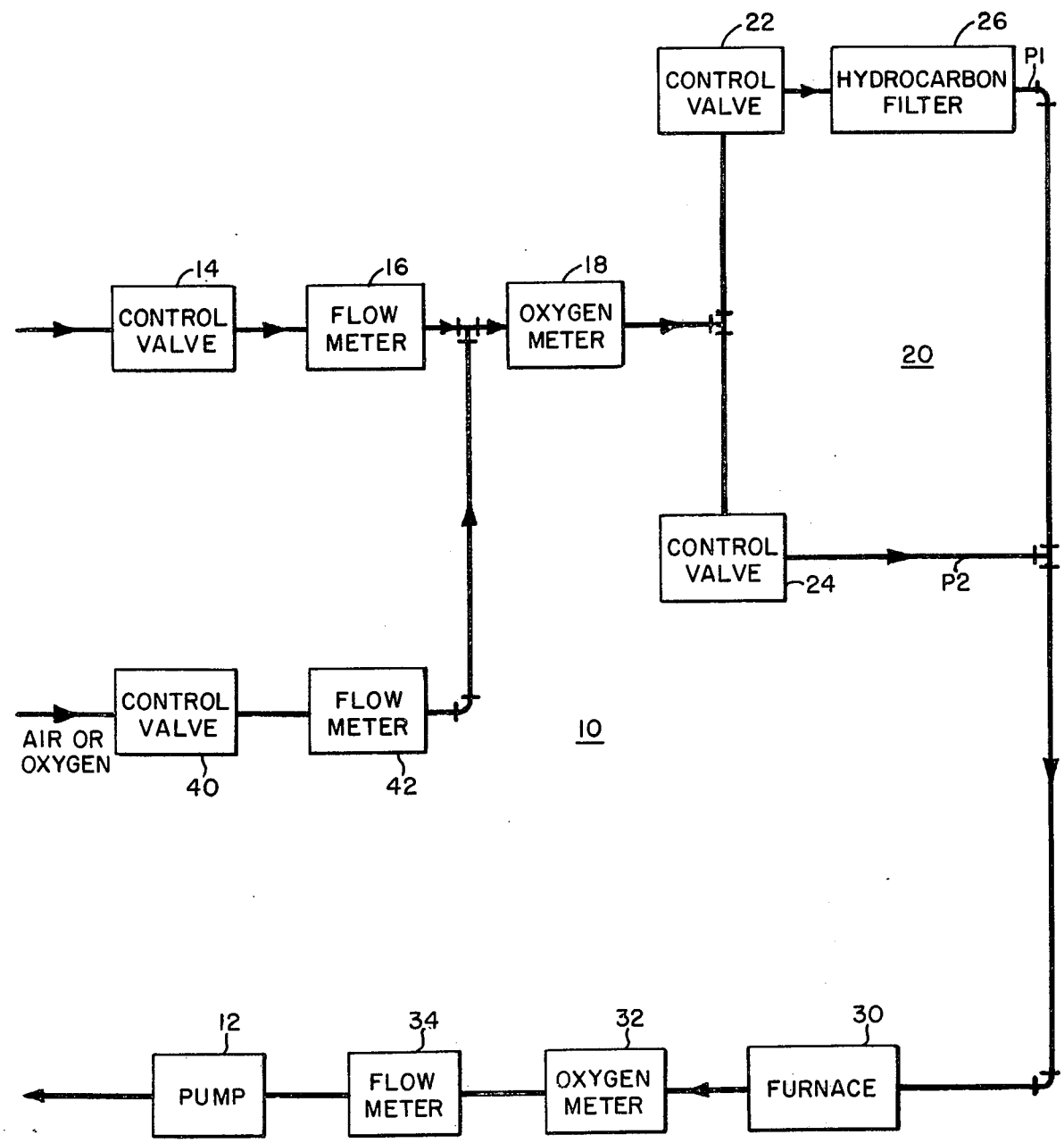
FIG. 1 is a block diagram of the schematic embodiment of the combustion technique for measuring the carbon monoxide and reactive hydrocarbon content of the gas.

Referring to FIG. 1 there is illustrated schematically a basic implementation of the combustion technique for determining the reactive hydrocarbon content and carbon monoxide content of a gas.

Assume for the purpose of discussion that any excess combustible situation of the type identified above as conditions 1 or 2 exists. A sample of a gas from a source such as internal combustion engine or an industrial process is drawn into the gas processing apparatus 10 by means of a pump 12 through a control valve 14 which is adjusted to establish a flow rate measured by flow meter 16. The total oxygen content of the exhaust gas is measured by oxygen meter 18 prior to the exhaust gas being supplied to the gas flow loop 20. The gas flow loop 20 consists of parallel gas flow paths P1 and P2 wherein control valves 22 and 24 determine the gas flow through the gas flow loop 20. In addition to the control valve 22 positioned in the gas flow path P1, there is included a hydrocarbon trap 26 which functions to trap the reactive hydrocarbon content, excluding methane, of the gas when the gas flow is directed through the path P1. The furnace 30, which functions as a combustor, burns the combustibles present in the exhaust gas drawn through the gas flow loop 20, and supplies the gas less the consumed combustibles to the oxygen meter 32.

While the oxygen meters 18 and 32 can be implemented through the use of numerous commercially available oxygen indicating devices, it will be assumed, for the purpose of discussing the embodiment of FIG. 1, that the oxygen meters are solid electrolyte oxygen concentration cells of the type described in U.S. Pat. No. 3,400,054 which is assigned to the assignee of the present invention. The solid electrolyte concentration cell developed an EMF output signal at platinum electrodes disposed on opposite surfaces of a solid electrolyte as a function of the difference in partial pressure of oxygen on either side of the solid electrolyte. Typically, as will be assumed in the embodiment disclosed herein, a stable oxygen environment is established at one electrode of the solid electrolyte while the opposite electrode is subjected to the gas. While the embodiment illustrates a combustor, or furnace, 30 preceding the oxygen meter 32, the fact that the solid electrolyte concentration cell typically operates at a temperature of 850°C, the combustion produced by the electrodes would permit the elimination of the furnace 30 since combustion of the combustibles in the gas could take place in the oxygen meter 32. However, in order to provide a clear understanding of the embodiment disclosed the separate furnace 30 has been included thus limiting the function of the oxygen meter 32 to that of measuring the oxygen content of the gas following removal of the combustibles.

In order to satisfy the requirement for introducing supplemental oxygen into the exhaust gas under conditions 1 and 2 identified above, there is included in the embodiment a control valve 40 and a flow meter 42 which function to introduce a measured amount of oxygen into the gas prior to measurement by the oxygen meter 18. Under excess oxygen conditions, identified as condition 3 above, the control valve 40 is closed and no supplemental oxygen is introduced into the gas stream. Under the excess combustibles conditions corresponding to either condition 1 or 2 identified above, supplemental oxygen is introduced into the gas. The determination of the carbon monoxide content of the exhaust gas is achieved by opening valve 22 and closing valve 24 thus directing the flow of gas through the hydrocarbon trap 26 of gas flow path P1. Following removal of the reactive hydrocarbon content by the hydrocarbon trap 26, the gas is supplied to furnace 30 to remove the remaining combustibles of which carbon monoxide is the major constituent. The oxygen meter 32 measures the oxygen remaining in the exhaust gas following the combustion in the furnace 30. Under the excess combustibles condition, supplemental oxygen is supplied until the stoichiometric or "break point" between oxygen and combustibles occurs. The break point indication is manifested by a sudden change in the oxygen measurement by the oxygen meter 32. This break point is manifested by the oxygen concentration cell as a sudden substantial increase in output EMF. The reaction taking place in the furnace 30 under these conditions can be represented as:

$$CO + 0.5\ O_2 \rightarrow CO_2 \qquad (1)$$

Under these conditions the carbon monoxide content can be determined as follows:

$$\%CO = \frac{\text{(Total Flow Rate)}A\ \text{(Total }O_2)E}{0.5\ \text{Sample Gas Flow Rate (Flow Meter 16)}} \qquad (2)$$

were total flow rate A corresponds to the combined flow rates through flow meters 16 and 42 and E identifies a total oxygen content as measured by oxygen meter 18. Flow rates in these equations correspond to quantity per unit time.

The measurement of the hydrocarbon content of the exhaust gas under the excess combustible conditions is achieved by closing valve 22 and opening valve 24 thus supplying the gas containing both carbon monoxide and hydrocarbons to the furnace 30 for combustion with the oxygen contained within the gas. Following the same procedure identified above supplemental oxygen is introduced into the exhaust gas by control valve 40 until the stoichiometric or "break point" occurs in the combustion process occurring within the furnace 30. The reactions occurring within the furnace 30 under these conditions are represented as:

$$C_6H_{14} + 9.5\ O_2 \rightarrow 6CO_2 + 7H_2O \qquad (3)$$

Wherein $C_6H_{14}$ (hexane) represents all organic constituents. Under these conditions both the carbon monoxide and hydrocarbons are burned within the furnace 30 and the hydrocarbon content (expressed as hexane) of the exhaust gas is determined as follows:

$$\%HC = \frac{[(\text{Total Flow Rate})_A(\text{Total } O_2)_E]_{CO+HC} - [(\text{Total Flow Rate})_A(\text{Total } O_2)_E]_{CO}}{Q \text{ Sample Gas Flow Rate (Flow Meter 16)}} \quad (4)$$

were the definitions of flow rate. A and the oxygen content E correspond to the definitions recited above. The subscript CO + HC refers to a situation where the gas flows through path P2 while the subscript CO refers to the situation where the gas flows through the flow path P1. The letter Q identifies a coefficient which is determined by the hydrocarbon of interest. Q is the number of molecules of oxygen required for the complete combustion of an individual hydrocarbon. For hexane, as indicated above, Q is 9.5. For butane, Q would be 6.5.

For condition 3, the breakpoint method cannot be used because oxygen already is in excess. Consequently, the readings of the oxygen meter 18 and the oxygen meter 32 must be used, in that the difference in these readings represents the oxygen consumed when the combustibles pass through the oxygen meter 32. The reading of flow meter 34 is used because of the reduction in volume when the hydrocarbons are removed by the hydrocarbon filter 26 and the additional volume change brought about by the combustion in the furnace 30. For the combustion of carbon monoxide, it will be noted that there is a reduction in volume or flow rate. For the combustion of "hexane," there is an increase in volume or flow rate. By using a third flow meter, flow meter 34, the calculations are much simplified and more accurate analysis obtained. With the gas flowing through the hydrocarbon filter 26, the carbon monoxide content is calculated by:

$$\% CO = \frac{[(\text{Total flow rate})(\% O_2)_A] - [(\text{Final flow rate})(\% O_2)_B]}{0.5 \text{ Sample gas flow rate (Flow Meter 16)}} \quad (5)$$

where the total flow rate is the combined measurement of flowmeters 16 and 42, $(\% O_2)_A$ by the oxygen meter 18, final flow rate by flow meter 34 and $(\% O_2)_B$ by the oxygen meter 32.

For the hydrocarbon measurement the sample flows directly to oxygen meter 32 through path P2. The calculation is by:

$$\%HC = \frac{[(\text{Final flow rate})(\% O_2)_B]_{CO} - [(\text{Final flow rate})(\% O_2)_B]_{CO+HC}}{Q \text{ Sample gas flow rate (Flow Meter 16)}} \quad (6)$$

where final flow rates, sample flow rate, and $(\% O_2)_B$ are measured as an indication of the carbon monoxide. The subscript CO refers to the measurement involved in the second term on the right side of the preceding equation and the subscript CO+HC refers to the measurement made when the hydrocarbon filter 26 is bypassed and the gas flows to the oxygen meter 32.

Figure 2:
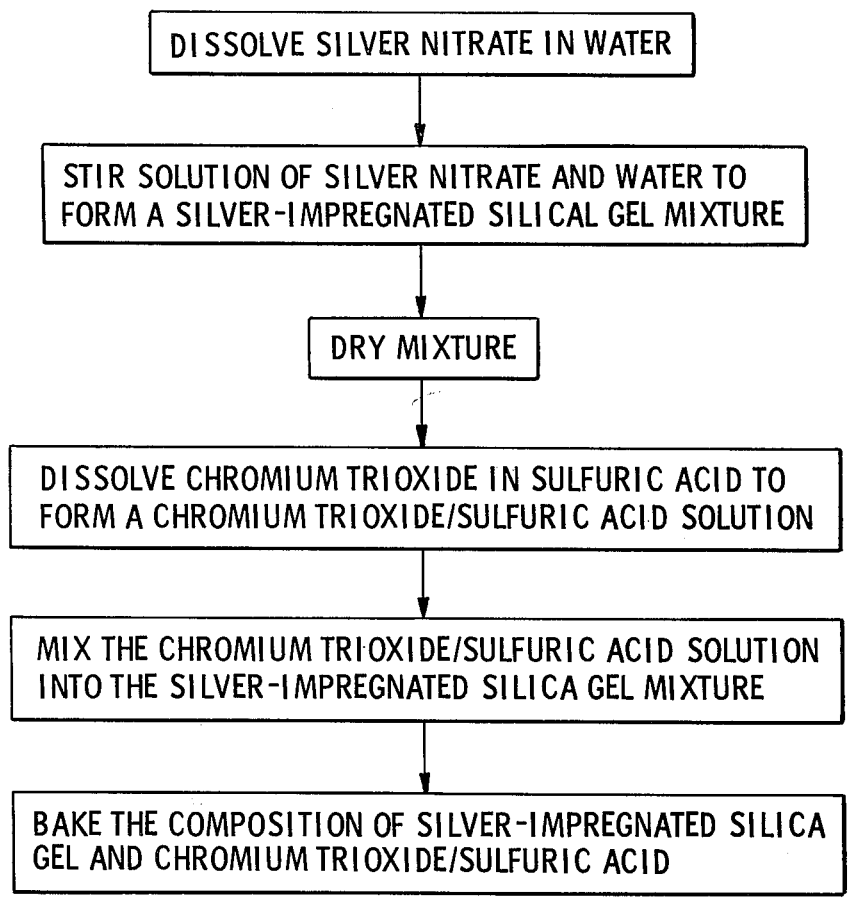
FIG. 2 is a block flow chart illustrating a process for making a chemical hydrocarbon trap.

As noted above, through path P2 the use of flow meter 34 makes possible a more accurate value for carbon monoxide and hydrocarbons. However, if flow meter 34 is omitted and the total flow rate used with the reading of the oxygen meter 32, carbon monoxide results will be low by only 2.5% of the amount present at the 5% level and only 0.5% at the 1% level. On the same basis hydrocarbon results will be high by only 0.1% of the amount present at the 0.05% level and proportionately lower at lesser amounts of hydrocarbons. Thus, for automobile exhaust analysis, flow meter 34 could be omitted. At high percentages of carbon monoxide and hydrocarbon, the use of flow meter 34 could be advisable. With flow meter 34 eliminated, the two preceding equations reduce respectively to:

$$\% CO = \frac{(\text{Total flow rate})[(\% O_2)_A - (\% O_2)_B]_{CO}}{0.5 \text{ Sample gas flow rate (Flow Meter 16)}} \quad (7)$$

$$\%HC = \frac{(\text{Total flow rate}) \{[(O_2)_B]_{CO} - [(\% O_2)_B]_{CO+HC}\}}{Q \text{ Sample gas flow rate (Flow Meter 16)}} \quad (8)$$

where all terms have the same meanings as for the two preceding equations except the subscript CO refers to $(\% O_2)_B$ made for CO and subscript CO+HC refers to the measurement with the hydrocarbon filter 26 bypassed by means of path P2. The hydrocarbon filter 26 is designed to trap primarily the smog producing hydrocarbons. The hydrocarbon filter 26 passes both methane and ethane, neither of which are smog producing hydrocarbons, for complete combustion in the furnace 30. The initial formulations of hydrocarbon traps or filters for use in the illustrated embodiment involved potassium dichromate in sulfuric acid on silica gel. Subsequent testing indicated that chromium trioxide in sulfuric acid on silica gel produced a hydrocarbon filter formulation which removed most of the representative hydrocarbon to insignificant levels of detectability. Species not completely removed included ethane, ethylene, and acetylene. Further testing and evaluation disclosed that if silver ions were added to the chromium trioxide/sulfuric acid/silica gel filter, the efficiency of the hydrocarbon filter was improved so that both acetylene and ethylene was removed. A typical hydrocarbon filter formulation in accordance with the above discovery is illustrated in FIG. 2 and represented as follows:

1. 0.2 g silver nitrate is dissolved in 15 ml water.
2. The solution is stirred into 25g silica gel (30–60 mesh).
3. The mixture is dried 1.5 hrs. at 125°C.
4. 2 ml 1:1 sulfuric acid/water is diluted with 60 ml water.
5. 1.00 g chromium trioxide is dissolved in the sulfuric acid solution.
6. 15 ml of the chromium trioxide/sulfuric acid solution is mixed into the silver-impregnated silica gel from (3)(above).
7. The resultant mixture is baked 8 hrs at 125°C then stored in a desiccator until used.

Since a typical automobile on the road today emits about 500 ppm hydrocarbons, the gas mixture used to evaluate the hydrocarbon filters contained specified hydrocarbons at levels near 500 parts per million. The following table shows the hydrocarbons tested, their concentrations in terms of hexane equivalent, and their detectability. As indicated above, the hydrocarbon filter containing silver ions removed substantially all listed hydrocarbons to below detectability limits except for methane of which about 80% remained.

| Hydrocarbons Used to Evaluate Filter | | |
|---|---|---|
| Hydrocarbon | Concentration as ppm Hexane | Detectability Limit as ppm Hexane |
| Acetylene | 547 | 18 |
| Ethane | 522 | 17 |
| Ethylene | 492 | 20 |
| Propylene | 523 | 18 |
| Propadiene | 600 | 20 |
| Methyl Acetylene | 450 | 15 |
| 1-Butene | 447 | 75 |
| cis-trans 2-Butene | 520 | 121 |
| 1,3-Butadiene | 507 | 127 |
| Isopentane | 475 | 33 |
| cis,trans-2-Pentene | 513 | 54 |
| 2-Methyl-2-Butene | 578 | 33 |
| 2-Methyl-2Pentene | 530 | 88 |

What we claim is:

1. A combustion technique for determining the carbon monoxide and the smog and air pollutant reactive hydrocarbon content of a gas comprising the steps of;
   stoichiometrically reacting oxygen with the total combustibles content of a first sample of the gas,
   removing the smog and air pollutant reactive hydrocarbon content of a second sample of the gas,
   stoichiometrically reacting oxygen with the carbon monoxide content of said second sample of the gas following removal of the smog and air pollutant reactive hydrocarbon content, the oxygen required to produce said stoichiometric reaction representing the amount of oxygen required to change the carbon monoxide to carbon dioxide, said amount of oxygen being indicative of the carbon monoxide content of the gas ,and,
   determining the difference between the amount of oxygen required to stoichiometrically react with the carbon monoxide and the amount of oxygen required to stoichiometrically react with the total combustibles content of the gas, said difference being indicative of the smog and air pollutant reactive hydrocarbon content of the gas.

2. A combustion technique as claimed in claim 1 further including a step of introducing oxygen into said samples in the event insufficient oxygen is present in the gas for producing said stoichiometric reactions.

3. A combustion technique for determining the carbon monoxide and smog and air pollutant reactive hydrocarbon content of a gas wherein the oxygen content of the gas is less than that required to stoichiometrically react with the total combustibles content of the gas, comprising the steps of;
   introducing oxygen into a sample of the gas to a level sufficient to produce a stoichiometric reaction with the total combustibles content of the gas,
   measuring the amount of oxygen required to produce said stoichiometric reaction between the oxygen and said total combustibles,
   trapping the smog and air pollutant reactive hydrocarbon content of a second sample of the gas,
   introducing oxygen to stoichiometrically react with the carbon monoxide content of said second sample of the gas following trapping of the smog and air pollutant reactive hydrocarbon content,
   measuring the oxygen required for stoichiometrically reacting with the carbon monoxide content of the gas, said measurement of the oxygen required to stoichiometrically react with the carbon monoxide representing the amount of oxygen required to change the carbon monoxide to carbon dioxide and said measurement being indicative of the carbon monoxide content of the gas, and
   determining the difference between the amount of oxygen required to stoichiometrically react with the carbon monoxide and the amount of oxygen required to stoichiometrically react with the total combustibles content, said difference representing the oxygen required to convert said smog and air pollutant reactive hydrocarbon content to carbon dioxide and water, said difference being indicative of the smog and air pollutant reactive hydrocarbon content of the gas.

4. A combustion technique for measuring the carbon monoxide and the smog and air pollutant reactive hydrocarbon content of a gas containing oxygen in excess of that required to produce a stoichiometric reaction with the total combustibles content of the gas, comprising the steps of,
   measuring the total oxygen content of a sample of the gas,
   stoichiometrically reacting oxygen contained within said sample of the gas with the total combustibles content of said sample,
   measuring the oxygen remaining following said stoichiometric combustion between the oxygen and the total combustibles,
   trapping the smog and air pollutant reactive hydrocarbon content of a second sample of the gas,
   stoichiometrically combusting oxygen within said second sample with the carbon monoxide remaining in said second sample following said trapping,
   measuring the amount of oxygen required to stoichiometrically react with said carbon monoxide, said measurement of the oxygen required to stoichiometrically react with the carbon monoxide representing the oxygen required to convert the carbon monoxide to carbon dioxide, said measurement being indicative of the carbon monoxide content of the gas, and
   determining the difference between the amount of oxygen required to stoichiometrically react with the carbon monoxide and the amount of oxygen required to stoichiometrically react with the total combustibles content of the gas, said difference being indicative of the smog and air pollutant reactive hydrocarbon content of the gas.

* * * * *